United States Patent [19]

Haskett et al.

[11] Patent Number: 4,919,287
[45] Date of Patent: Apr. 24, 1990

[54] DISPLAY UNIT FOR CONSUMER PRODUCTS

[76] Inventors: Wayne J. Haskett, 10443 S. Natoma, Chicago Ridge, Ill. 60415; Leonard Andersen, 5361 W. Otto Pl.; John A. Andersen, 10215 S. Kildare, both of Oak Lawn, Ill. 60453

[21] Appl. No.: 202,216

[22] Filed: Jun. 3, 1988

[51] Int. Cl.$^5$ .............................................. A47G 19/08
[52] U.S. Cl. ..................................... 211/41; 40/124.4; 206/555; 211/71
[58] Field of Search ............................. 211/71, 41, 13; 312/323, 319, 16; 40/124.4, 152, 611, 642; 206/555, 556, 449

[56] References Cited

U.S. PATENT DOCUMENTS

| | | | |
|---|---|---|---|
| 2,576,983 | 12/1951 | Walker | 211/13 X |
| 3,296,724 | 1/1967 | Deuchar | 40/642 |
| 4,257,524 | 3/1981 | Yonkers et al. | 211/71 |
| 4,497,125 | 2/1985 | Hutchinson | 40/124.4 X |
| 4,691,826 | 9/1987 | Ozeki | 206/555 X |
| 4,715,669 | 12/1987 | Baillie et al. | 312/319 X |
| 4,785,578 | 11/1988 | Grene | 211/71 X |

FOREIGN PATENT DOCUMENTS

| | | | |
|---|---|---|---|
| 211088 | 2/1987 | European Pat. Off. | 211/13 |
| 538573 | 3/1922 | France | 211/71 |

*Primary Examiner*—David L. Talbott
*Attorney, Agent, or Firm*—Wood, Phillips, Mason, Recktenwald & Vansanten

[57] ABSTRACT

A display unit for a consumer product such as a compact disk, digital audio tape, cassette tape or video tape. The display unit includes a frame having at least one generally rectangular opening adapted to receive the consumer product therewithin. The opening is defined by parallel top and bottom frame portions joined by parallel side frame portions. The frame has a front side through which the consumer product can be placed in the opening and a rear side opposite thereof. The display unit is also formed such that one of either the top and bottom frame portions or the side frame portions is spaced apart by a greater distance then the corresponding vertical or horizontal dimension, respectively, of the consumer product and the other of either the top and bottom frame portions or the side frame portions is spaced apart by a distance substantially the same as the corresponding vertical or horizontal dimension, respectively of the consumer product. The display unit further includes a retainer associated with the one of either the top and bottom frame portions or the side frame portions which are spaced apart by the greater distance. The retainer is such that the consumer product can be repeatedly inserted into the opening and removed from the opening on demand. The retainer also is adapted to retain the consumer product in the opening until such time as the consumer product is removed on demand. With these features, the display unit is well suited for storing and/or displaying compact discs, digital audio tapes, cassette tapes, video tapes and the like.

10 Claims, 2 Drawing Sheets

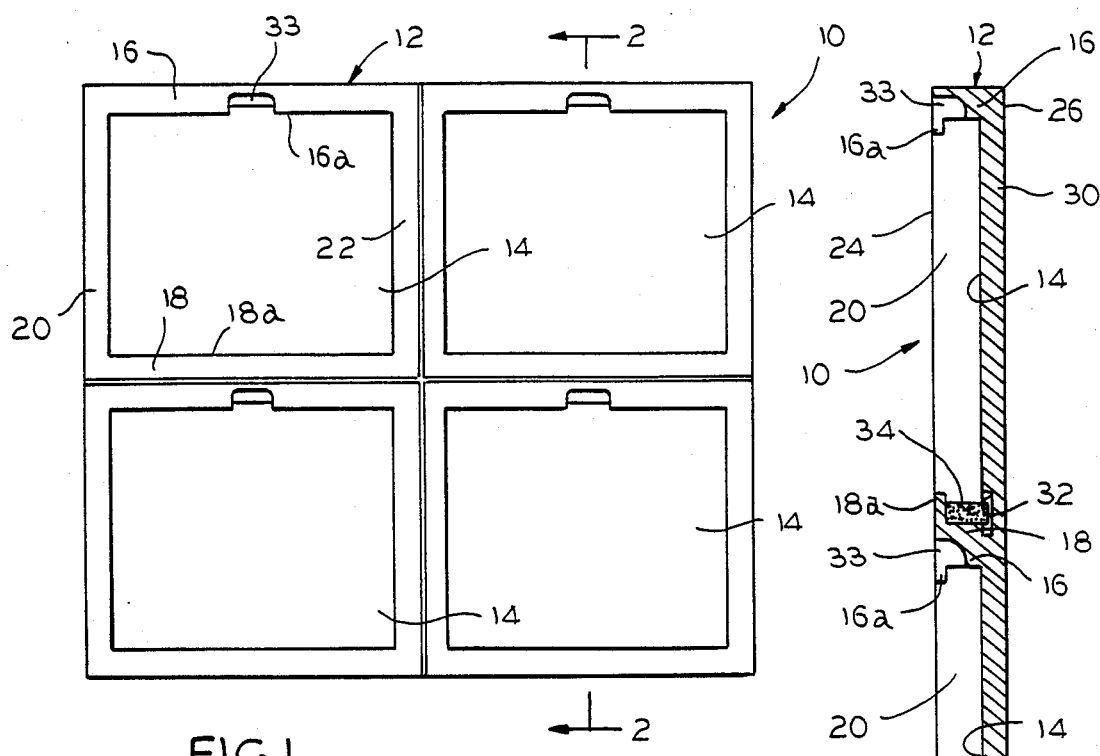
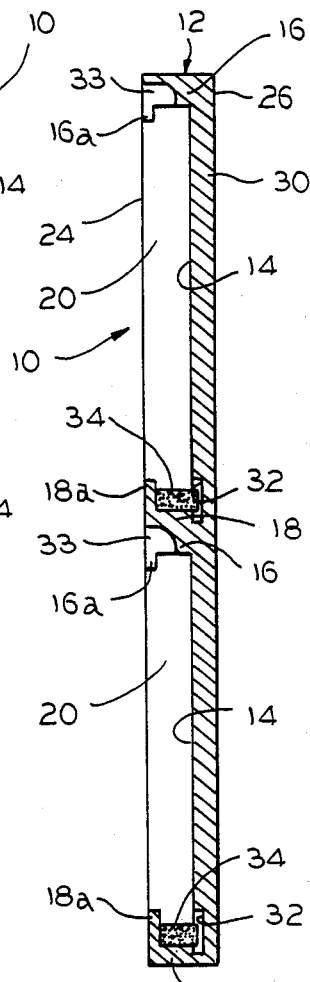
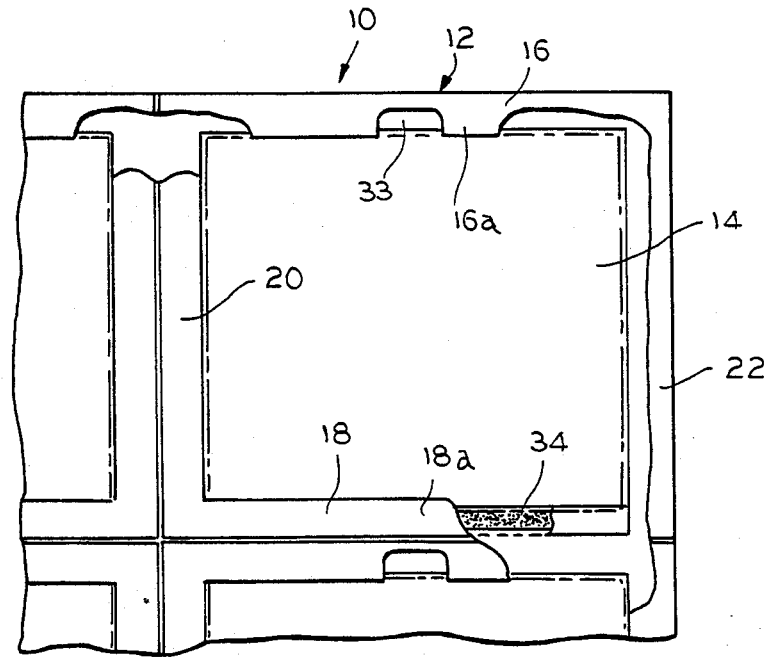
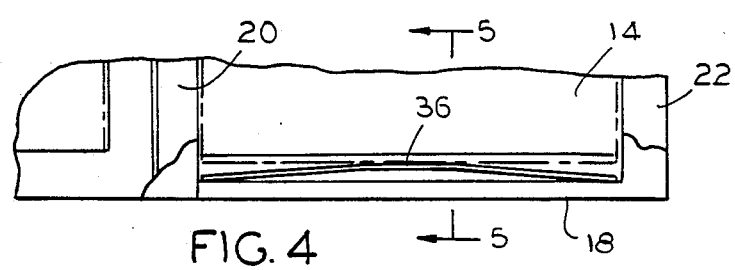
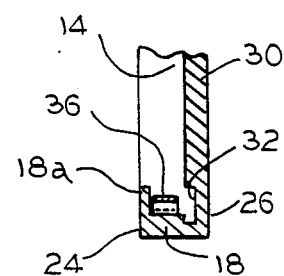
FIG.1
FIG.2
FIG.3
FIG.4
FIG.5

DISPLAY UNIT FOR CONSUMER PRODUCTS

FIELD OF THE INVENTION

The present invention generally relates to consumer product display units and, more particularly to a display unit for a compact disk, digital audio tape, cassette tape or video tape.

BACKGROUND OF THE INVENTION

In recent years, there have become available many diverse forms of home entertainment. These have included various forms of recreating music which have largely supplanted conventional stereophonic phonograph records such as compact discs, digital audio tapes and cassette tapes and have also included video tapes for home video cassette recorder use which is now a large and growing industry. Since any individual may well have many such discs and/or tapes, storage in the home has become a serious problem.

More particularly, the owner of such discs and or tapes must have a compact method of storage. However, it is equally well recognized that any such storage should not only keep such discs and/or tapes well organized, but also subject to prompt identification and easy access so the discs and/or tapes will not fall into disuse simply because of inconvenience. For this purpose, there have been on the market a wide variety of storage units in the form of racks.

While such racks are well suited for compact storage, they have been found to be unsatisfactory for several reasons. Perhaps most importantly, they usually only allow visual inspection of a single end of a container for the discs and/or tapes which is, of course, usually a very narrow surface meaning that the user must scan the printed matter of a large number of such discs and/or tapes to identify the one being sought for use at any particular point in time. Simply stated, this is a difficult identification task which could be rendered far more simple by inspection of the front face of the container for such disks and/or tapes.

In this connection, it is well known that the containers for such disks and/or tapes usually have visually interesting art work on the front face thereof. This has long been the case with regard to stereophonic phonographic records which are stored in jackets having artwork on the cover which is oftentimes commissioned at considerable expense due to its intrinsic ability to attract attention and, thus, sales. More recently, the same artwork has been provided on the front face of containers for compact discs, digital audio tapes and cassette tapes, and similarly attractive artwork is commonly provided on video tapes for the same purpose.

Of course, not only does the artwork help identify the discs and/or tapes, but it is often sufficiently visually attractive to be desirable for open display. Thus, there has been a need for a display unit for such discs and/or tapes which would render it possible to take advantage of the attractive artwork by openly displaying it while at the same time facilitating easy identification and removal of any particular one of the discs and/or tapes for use. In addition, a display unit of this type could easily be used to great advantage by retail outlets for enhancing sales of such discs and/or tapes.

The present invention is directed to overcoming the foregoing problems and accomplishing the resulting objectives by providing a unique new display unit for consumer products.

SUMMARY OF THE INVENTION

Accordingly, the present invention is directed to a display unit for a consumer product. The display unit includes a frame having at least one generally rectangular consumer product-receiving opening adapted to receive the consumer product therewithin. The opening is defined by parallel top and bottom frame portions joined by parallel side frame portions. The frame has a front side through which the consumer product can be placed in the consumer product-receiving opening and a rear side opposite thereof. One of either the top and bottom frame portions or the side frame portions are spaced apart by a greater distance than the corresponding vertical or horizontal dimension, respectively, of the consumer product and the other of either the top and bottom frame portions or the side frame portions are spaced apart by a distance substantially the same as the corresponding vertical or horizontal dimension, respectively, of the consumer product. The display unit also includes retention means associated with the one of either the top and bottom frame portions or the side frame portions spaced apart by the greater distance. The retention means is such that the consumer product can be repeatedly inserted into the consumer product-receiving opening and removed from the consumer product-receiving opening on demand. The retention means also is adapted to retain the consumer product in the consumer product-receiving opening until the product is removed on demand. With these features, the display unit is particularly well suited for use with a plurality of generally rectangular shaped consumer products such as compact discs, digital audio tapes, cassette tapes and video tapes.

In the preferred embodiment, the display unit includes barrier means integrally associated with the rear side of the frame so as to permit insertion of the consumer product into the consumer product receiving-opening only through the front side thereof. The barrier means is preferably defined by a rear wall integral with the rear side of the frame in spaced relation to the front side of the frame by substantially the same distance as the width dimension of the consumer product. Further, the retention means advantageously includes an inwardly projecting flange associated with each of the one of either the top and bottom frame portions or the side frame portions spaced apart by the greater distance.

Preferably, the inwardly projecting flanges are spaced apart by a distance sufficient to permit insertion of the consumer product into the consumer product-receiving opening at an oblique angle to the plane of the frame. The display unit also advantageously includes a groove in the rear wall directly opposite one of the flanges adjacent to the corresponding one of the frame portions to accommodate insertion of the consumer product into the consumer product-receiving opening at the oblique angle with the inwardly protecting flanges being spaced apart by a distance sufficient to accommodate retaining the consumer product in the consumer product-receiving opening until the consumer product is removed on demand. Still further, the display unit preferably includes access means associated with the other of the flanges remote from the groove in the rear wall for effecting removal of the consumer product from the consumer product-receiving opening.

Still other objects, advantages and features of the present invention will become apparent from a consideration of the following specification taken in conjunction with the accompanying drawings.

BRIEF DESCRIPTION OF THE DRAWINGS

FIG. 1 is a front elevational view of a display unit for a consumer product in accordance with the present invention;

FIG. 2 is a cross sectional view of the display unit illustrating details thereof as taken on the line 2—2 of FIG. 1;

FIG. 3 is a close-up view of a portion of the display unit of FIG. 1 with portions broken away for illustrating details thereof;

FIG. 4 is a close-up view of a portion of the display unit of FIG. 1 with portions broken away for illustrating an alternative embodiment thereof;

FIG. 5 is a cross sectional view of the display unit illustrating details thereof as taken on the line 5—5 of FIG. 4;

DETAILED DESCRIPTION OF THE PREFERRED EMBODIMENTS

Figure 6:
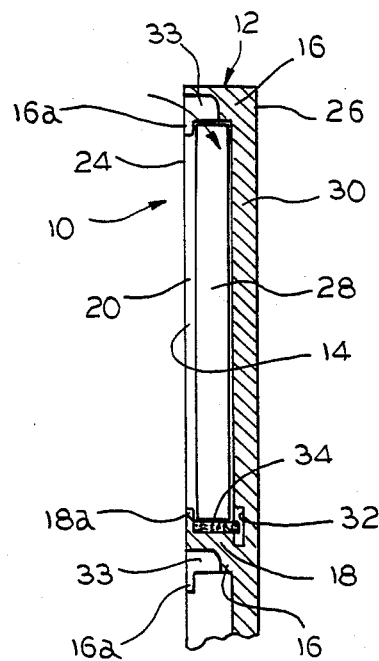
FIG. 6 is a cross sectional view similar to FIG. 2 illustrating a consumer product being retained in the display unit of FIG. 1.

Referring to the drawings, and first to FIG. 1, the reference numeral 10 designates generally a display unit for a consumer product. The display unit 10 includes a frame generally designated 12 which has at least one generally rectangular consumer product-receiving opening 14 therewithin. The opening 14 is defined by parallel top and bottom frame portions 16 and 18 joined by parallel side frame portions 20 and 22. The frame 12 has a front side 24 through which the consumer product can be placed in the opening 14 and a rear side 26 opposite thereof. One of either the top and bottom frame portions 16 and 18 or the side frame portions 20 and 22 are spaced apart by a greater distance than the corresponding vertical or horizontal dimension, respectively, of the consumer product 28 (see FIGS. 6 and 7) and the other of either the top and bottom frame portions 16 and 18 or the side frame portions 20 and 22 are spaced apart by a distance substantially the same as the corresponding vertical or horizontal dimension, respectively, of the consumer product 28. The display unit 10 also includes retention means associated with the one of either the top and bottom frame portion 16 and 18 or the side frame portions 20 and 22 spaced apart by the greater distance. The retention means is such that the consumer product 28 can be repeatedly inserted into the opening 14 and removed from the opening 14 on demand. The retention means also is adapted to retain the consumer product 28 in the opening 14 until the consumer product is removed on demand. Preferably, the retention means includes an inwardly rejecting flange such as 16a and 18a associated with each of the top and bottom frame portions 16 and 18.

As will be appreciated by referring to FIG. 2, the display unit 10 preferably includes barrier means such as a rear wall 30 integral with the rear side 26 of the frame 12 in spaced relation to the front side 24 of the frame 12 by substantially the same distance as the thickness dimension of the consumer product 28. This permits insertion of the consumer product 28 into the opening 14 only through the front side 24 of the frame 12. Of course, the inwardly projecting flanges 16a and 18a are spaced apart by a distance sufficient to permit insertion of the consumer product 28 into the opening 14 at an oblique angle to the plane of the frame 12 (see FIG. 7).

While the rear wall 30 has been described as integral with the rear side of the frame 12, it will be understood that this can include forming the rear wall as a snap-in component. Thus, especially if the display unit 10 is formed of plastic, the rear wall 30 can be fastened to the wall in a room by any conventional means such as pressure sensitive adhesive fasteners or positive fasteners such as screws after which the remainder of the display unit can be reassembled to the rear wall 30 by pressing the two components together. Of course, the display unit 10 can be formed not only of plastic but also of other conventional materials including wood to suit a wide variety of tastes and accommodate a range of decor.

Figure 7:
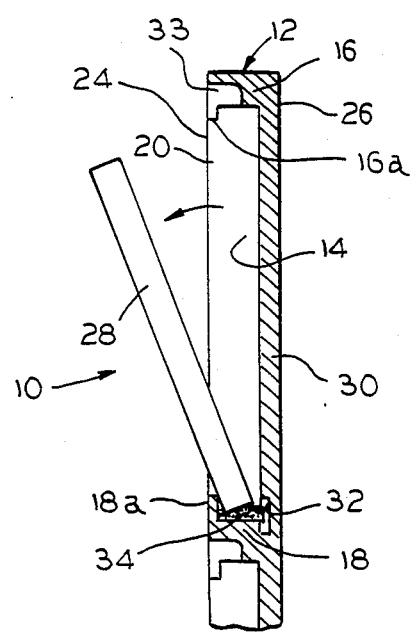
FIG. 7 is a cross sectional view similar to FIG. 2 illustrating a consumer product being inserted and/or removed from the display unit of FIG. 1.

As shown in FIGS. 2, 6 and 7, the display unit 10 includes a groove 32 in the rear wall 30 directly opposite one of the flanges 18a adjacent the corresponding one of the frame portions 18 to accommodate insertion of the consumer product 28 into the opening 14 at the oblique angle. It will be appreciated that the inwardly projecting flanges 16a and 18a are spaced apart by no more than a distance sufficient to accommodate retaining the consumer product 28 in the opening 14 until the consumer product is removed on demand (see FIG. 6). For effecting removal of the consumer product 28 from the opening 14, the display unit 10 preferably includes access means such as a thumb hole or notch 33 associated with the other of the flanges 16a remote from the groove 32 in the rear wall 30.

As will be appreciated by referring to FIG. 1, the display unit 10 can advantageously be formed to hold a plurality of consumer products 28. Thus, as shown, the generally rectangular shaped frame 12 has a plurality of openings 14 which, in the embodiment illustrated, comprises one such opening 14 in each of the four quadrants of the display unit 10. Of course, each of the openings 14 is defined by parallel top and bottom frame portions 16 and 18 joined by parallel side frame portions 20 and 22.

Referring specifically to FIGS. 2, 3, 6 and 7, the display unit 10 preferably includes biasing means such as a compressible resilient material as at 34 disposed on each of the bottom frame portions 18. This compressible resilient material 34 is provided to bias the consumer products 28 toward the respective top frame portions 16 after the consumer products 28 have been inserted in the spaces between the respective inwardly projecting flanges 18a and the rear wall 30 and pivoted into the respective openings 14 under the flanges 16a. As will be appreciated, the compressible resilient material 34 is adapted to maintain the consumer products 28 in engagement with the top frame portions 16 until removal from the openings 14.

Referring to FIGS. 4 and 5, an alternative embodiment is illustrated. This alternative embodiment biasing means comprises a compressible spring 36 disposed on each of the bottom frame portions 18. The compressible springs 36, of course, serve the same function as the compressible resilient material 34 in that they permit a consumer product 28 to be inserted into the space between any one of the inwardly projecting flanges 18a and the rear wall 30 at an oblique angle after which the consumer product 28 can be pressed downwardly to depress the corresponding one of the springs 36 sufficiently for the consumer product 28 to clear the corresponding one of the inwardly projecting flanges 16a as the consumer product is pivoted into the corresponding one of the openings 14. When this has occurred, the spring 36 will bias the consumer product 28 upwardly into engagement with the top frame portion 16 behind the inwardly projecting flange 16a for retention thereof.

Referring to the grooves 32, FIG. 7 illustrates that they are provided to give sufficient clearance so that the consumer products 28 can be inserted into the space between the inwardly projecting flanges 18a and the rear wall 30 for pivoting movement into and away from the openings 14. Since the distance between the front side 24 of the frame 12 and the rear wall 30 is substantially the same as the thickness dimension of the consumer products 28, the groove is essential to accommodate the oblique angled insertion of the consumer products 28 as shown in FIG. 7.

Figure 8:
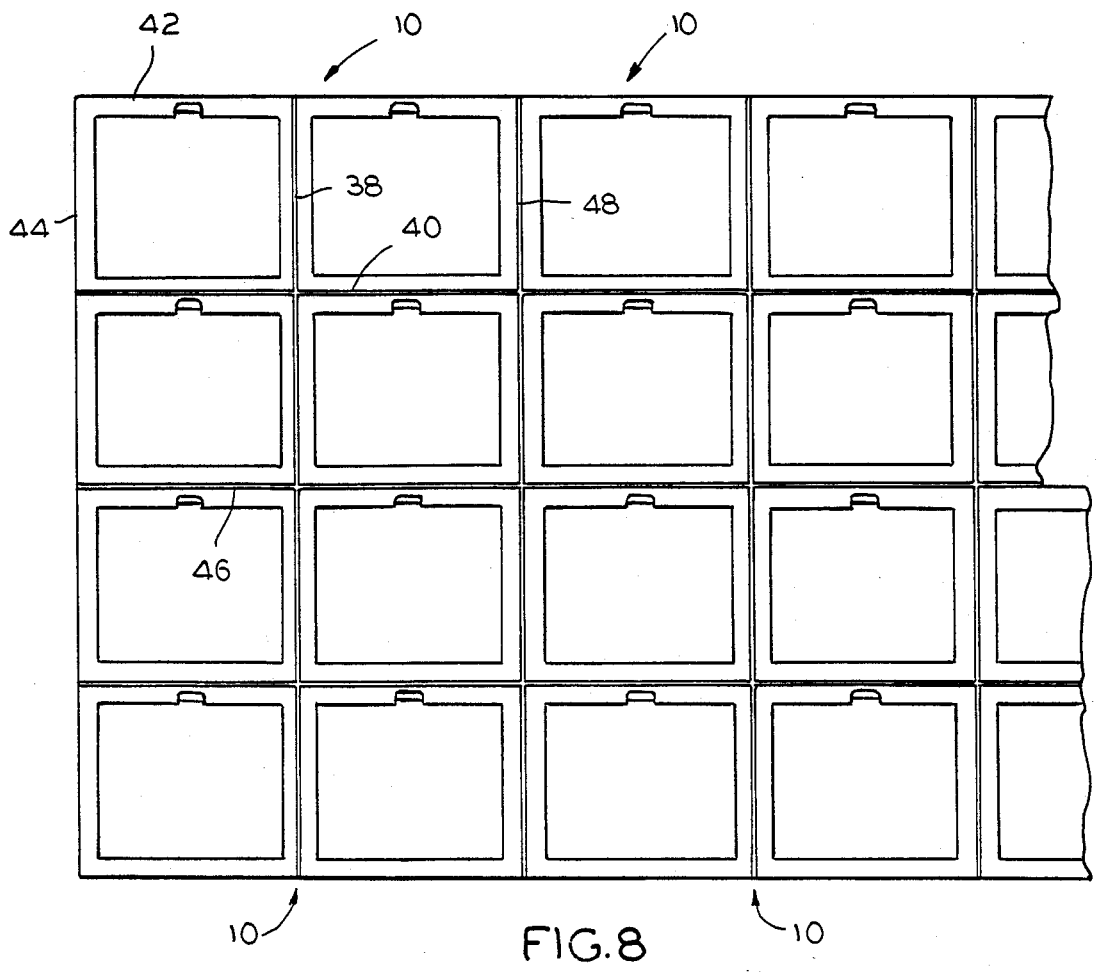
FIG. 8 is a front elevational view of an array of display units mounted on a wall.

Referring to FIG. 8, it will be seen that a plurality of the display units illustrated in FIG. 1 can be arranged on a wall. For this purpose, it is believed to be desirable to provide vertical V-shaped grooves 38 and horizontal V-shaped grooves 40 on the front sides 24 of the frames 12 so as to give the array of display units 10 an integral appearance when mounted on a wall which, of course, can be done by beveling the outer edges 42, 44, 46 and 48 which will then mimic the vertical grooves 38 and horizontal grooves 40 when placed in contacting adjacent relation to the corresponding beveled edge of the next adjacent of the display units 10. By mounting the display units 10 on a wall, it is then possible to not only easily identify a disc and/or tape for purposes of selecting one for use, but the stored discs and/or tapes provide an attractive and distinctive wall decoration or ornamentation.

While the thumb holes or notches 34 have been shown in the top frame portions 16, it will be appreciated that they could equally well be provided in the bottom frame portions 18. It will also be appreciated that the biasing means such as the compressible resilient material 34 or the springs 36 can be eliminated in the latter case by simply suitably sizing the inwardly projecting flanges 16a and 18a such that the consumer products 28 can be lifted into the recesses defined by the inwardly projecting flanges 16a and then pivoted outwardly for removal by clearing the inwardly projecting flanges 18a. Of course, the grooves 32 will then be positioned at the top of each of the openings 14.

Another further possible embodiment (not shown in the drawings) is for the display unit 10 to be formed as a tabletop cube. Then, there could be an opening 14 in each of four faces as well as an opening on the top of the cube which could, if desired, be placed on a rotating base. Still other variations of the invention will also be appreciated from the foregoing.

While there have been set forth preferred embodiments of the invention for purposes of illustration, it will be appreciated by those skilled in the art that the details herein given may be varied without departing from the true spirit and scope of the appended claims.

We claim:

1. A display unit for a plurality of consumer products, comprising:
    a frame having a plurality of generally rectangular consumer product-receiving openings adapted to receive said consumer products therewithin, said openings each being defined by parallel top and bottom frame portions joined by parallel side frame portions, said frame having a front side through which said consumer products can be placed in said consumer product-receiving openings and a rear side opposite thereof;
    said top and bottom frame portions of each of said consumer product-receiving openings being spaced apart by a greater distance than the corresponding vertical dimension of said consumer products and said side frame portions of each of said consumer product-receiving openings being spaced apart by a distance substantially the same as the corresponding horizontal dimension of said consumer products;
    a substantially continuous inwardly projecting flange associated with each of said top and bottom frame portions of each of said consumer product-receiving openings, said substantially continuous inwardly projecting flanges being spaced apart by a lesser distance than the corresponding vertical dimension of said consumer products but being spaced apart by a distance sufficient to permit insertion of said consumer products at an oblique angle to the plane of said frame and to permit pivoting of said consumer products into said opening under said flanges and being such that said consumer products can be repeatedly inserted into said consumer product-receiving openings and removed from said consumer product-receiving openings on demand only from said front side of said frame, said substantially continuous inwardly projecting flanges also being adapted to retain said consumer products in said consumer product-receiving openings until said consumer products are removed on demand; and
    barrier means integrally associated with said rear side of said frame so as to permit insertion of said consumer products into said consumer product-receiving openings only through said front side thereof, said barrier means being defined by a rear wall integral with said rear side of said frame in spaced relation to said front side of said frame by substantially the same distance as the width dimension of said consumer products.

2. The display unit as defined in claim 1 including a groove in said rear wall directly opposite one of said flanges associated with each of said consumer product-receiving openings to accommodate insertion of said consumer product into said consumer product-receiving opening at said oblique angle.

3. The display unit as defined in claim 2 including access means integral with the other of said flanges associated with each of said consumer product-receiving openings remote from the corresponding one of said grooves for effecting removal of said consumer product from said consumer product-receiving opening.

4. The display unit as defined in claim 3 wherein said access means is a centrally disposed thumb hole in each of said top flanges and said biasing means is a compressible resilient material disposed on each of said bottom frame portions.

5. The display unit as defined in claim 1 including biasing means associated with said bottom frame portions for biasing said consumer products toward said top frame portions, said biasing means being adapted to maintain said consumer products in engagement with said top frame portions until removal from said consumer product-receiving opening.

6. A display unit for a consumer product, comprising:
a frame having at least one consumer product-receiving opening adapted to receive said consumer product therewithin, said opening being defined by parallel top and bottom frame portions, said frame having a front side through which said consumer product can be placed in said consumer product-receiving opening and a rear side opposite thereof;
said top and bottom frame portions being spaced apart by a greater distance than the corresponding dimension of said consumer product; and
a substantially continuous inwardly projecting flange associated with each of said top and bottom frame portions, said substantially continuous inwardly projecting flanges being spaced apart by a lesser distance than the corresponding vertical dimension of said consumer product but being spaced apart by a distance sufficient to permit insertion of said consumer product at an oblique angle to the plane of said frame and to permit pivoting of said consumer product into said opening under said flanges and being such that said consumer product can be repeatedly inserted into said consumer product-receiving opening and removed from said consumer product-receiving opening on demand only from said front side of said frame, said substantially continuous inwardly projecting flanges also being adapted to retain said consumer product in said consumer product-receiving opening until said consumer product is removed on demand.

7. The display unit as defined in claim 6 including barrier means integrally associated with said rear side of said frame so as to permit insertion of said consumer product into said consumer product-receiving opening only through said front side thereof.

8. The display unit as defined in claim 7 wherein said barrier means is defined by a rear wall integral with said rear side of said frame in spaced relation to said front side of said frame by substantially the same distance as the width dimension of said consumer product.

9. The display unit as defined in claim 8 including a groove in said rear wall directly opposite one of said flanges adjacent the corresponding one of said frame portions to accommodate insertion of said consumer product into said consumer product-receiving opening at said oblique angle.

10. The display unit as defined in claim 9 including access means associated with the other of said flanges remote from said groove in said rear wall for effecting removal of said consumer product from said consumer product-receiving opening.

* * * * *